(12) United States Patent
Gengembre et al.

(10) Patent No.: US 8,463,725 B2
(45) Date of Patent: Jun. 11, 2013

(54) METHOD FOR ANALYZING A MULTIMEDIA CONTENT, CORRESPONDING COMPUTER PROGRAM PRODUCT AND ANALYSIS DEVICE

(75) Inventors: Nicolas Gengembre, Plechatel (FR); Sid Ahmed Berrani, Chantepie (FR)

(73) Assignee: France Telecom, Paris (FR)

( * ) Notice: Subject to any disclaimer, the term of this patent is extended or adjusted under 35 U.S.C. 154(b) by 428 days.

(21) Appl. No.: 12/810,434

(22) PCT Filed: Dec. 15, 2008

(86) PCT No.: PCT/FR2008/052305
§ 371 (c)(1),
(2), (4) Date: Jun. 24, 2010

(87) PCT Pub. No.: WO2009/081016
PCT Pub. Date: Jul. 2, 2009

(65) Prior Publication Data
US 2010/0280984 A1 Nov. 4, 2010

(30) Foreign Application Priority Data

Dec. 24, 2007 (FR) ...................... 07 60350

(51) Int. Cl.
*G06F 17/00* (2006.01)
(52) U.S. Cl.
USPC ............................. 706/45; 707/600
(58) Field of Classification Search
None
See application file for complete search history.

(56) References Cited

U.S. PATENT DOCUMENTS

| 6,892,193 | B2 * | 5/2005 | Bolle et al. | 706/20 |
| 7,167,574 | B2 * | 1/2007 | Kim | 382/100 |
| 8,010,511 | B2 * | 8/2011 | Brock et al. | 707/694 |
| 2007/0180537 | A1 * | 8/2007 | He et al. | 726/32 |

OTHER PUBLICATIONS

Gouet-Brunet V. et al., "Object Recognition and Segmentation in Videos by Connecting Heterogeneous Visual Features" Computer Vision and Image Understanding, Acedemic Press, US, vol. 111, No. 1, Feb. 1, 2008.
Berrani et al., "Robust Content-Based Image Searches for Copyright Protection" MMDB 2003, Nov. 7, 2003.
Chih-Yi Chiu et al., "Efficient Histogram-Based Indexing for Video Copy Detection" Multimedia Workshops, 2007. ISMW '07. Ninth IEEE International Symposium on, IEEE, Piscataway, NJ, USA, Dec. 10, 2007.
Chih-Yi Chiu et al., "Efficient and Effective Video Copy Detection Based on Spatiotemporal Analysis" Dec. 1, 2007.

(Continued)

*Primary Examiner* — Alan Chen
(74) *Attorney, Agent, or Firm* — David D. Brush; Westman, Champlin & Kelly, P.A.

(57) ABSTRACT

A method is provided for analyzing a piece of multimedia content including a time series of elementary entities, in order to check whether or not the piece of multimedia content includes at least one piece of reference content referenced in a content base. The method includes, for at least one elementary entity of the multimedia content and selected according to a predetermined selection rule, or current elementary entity: allocating a plausibility probability to each elementary entity of a set of current candidate elementary entities; allocating a transition probability between the current candidate elementary entity or entities and at least one previous candidate elementary entity; allocating an identification probability of at least one scenario including a time series of candidate elementary entities; deciding the recognition of one of the reference content and/or carrying on the analysis using a subsequent elementary entity of the piece of multimedia content.

13 Claims, 3 Drawing Sheets

OTHER PUBLICATIONS

Gengembre N. et al., "A Probabilistic Framework for Fusing Frame-Based Searches Within a Video Copy Detection System" Proc. of the ACM International Conference on Image and Video Retrieval, Jul. 7, 2008.

Joly A. et al., "Statistical Similarity Search Applied to Content-Based Video Copy Detection" ICDEW, p. 1285, 21st International Conference on Data Engineering Workshops (ICDEW'05), 2005.

French Search Report dated Aug. 8, 2008 for corresponding French Application No. FR0760350 filed Dec. 24, 2007.

International Search Report dated Apr. 27, 2009 for corresponding International Application No. PCT/FR2008/052305, filed Dec. 15, 2008.

International Preliminary Report on Patentability and Written Opinion dated Jul. 27, 2010 for corresponding International Application No. PCT/FR2008/052305, filed Dec. 15, 2008.

* cited by examiner

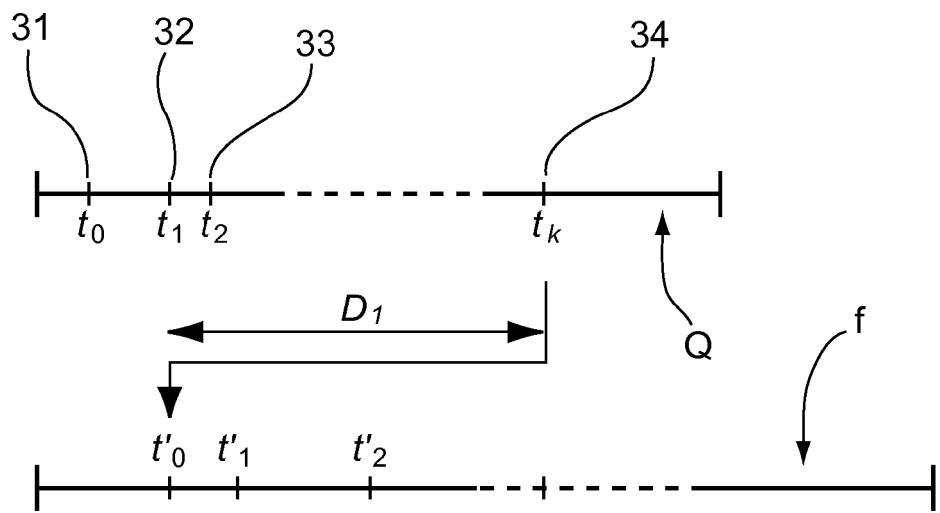
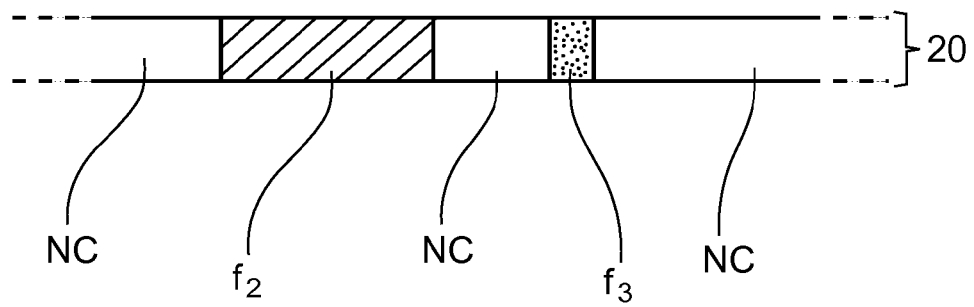
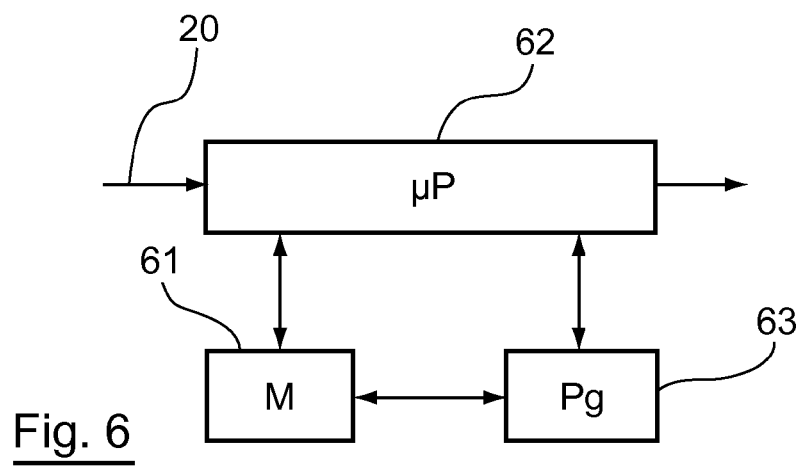

METHOD FOR ANALYZING A MULTIMEDIA CONTENT, CORRESPONDING COMPUTER PROGRAM PRODUCT AND ANALYSIS DEVICE

CROSS-REFERENCE TO RELATED APPLICATIONS

This Application is a Section 371 National Stage Application of International Application No. PCT/FR2008/052305, filed Dec. 15, 2008 and published as WO 2009/081016 on Jul. 2, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the transmission or exchange of multimedia contents. More specifically, the disclosure pertains to the analysis and control of such contents, especially in order to detect copies of a referenced content (for example illicit copies of a protected content).

BACKGROUND OF THE DISCLOSURE

1. Detection of Illicit Copies

The arrival of high-bit-rate applications offered by ADSL has led to the emergence of new services for facilitated consumption of multimedia content, for example video-on-demand services.

Classic providers such as France Television, TF1, Gaumont, etc (registered marks) as well as other actors from the telecom world such as Orange, Neuf, Free etc (registered marks), search engines such as Google Video, Yahoo Video etc (registered marks) or else specialist companies such as vodeo.fr, glowria, blinkx, TVEyes, skouk, etc (registered marks) thus propose, on line, part of their video catalogues. The multimedia contents proposed by these services are protected and subject for example to downloading against payment.

Furthermore, the recent development of multimedia exchange sites such as YouTube, DailyMotion, MySpace (registered marks) reveals the existence of a second source of multimedia contents. These multimedia contents come from the users themselves. Unfortunately, although a part of the contents observed on these exchange sites is truly created by the users, another part is constituted by contents illegally proposed for downloading.

It is therefore desirable to be able to detect illicit copies of a protected content.

More specifically the detection of video copies can be used to:
  identify the contents referenced in catalogues, i.e. referenced in a reference base in order to detect the illicit copies of the reference contents;
  list heavily copied contents (deduplication) in order to detect audience-generating contents or restrict storage sizes.

Such detection should be capable of taking into account the usual degradation undergone by a content in this context: high compression, resampling, cropping as well as overlay of text, logos, camcording, etc. Indeed, a copied content generally undergoes intentional transformations designed to make it hard to detect, as well as unintentional transformations caused by the recording of the content, when it is transcoded, or else caused by editorial constraints when it is republished.

Classically, the detection of copies of multimedia contents (images, sounds, videos etc) consists of a search for the presence or absence of a "suspect" request document in a protected documents base. Such a technique relies on two essential aspects:
  the description of the visual content of the video document, i.e. the descriptors used;
  the technique of indexing the descriptors, i.e. the method used to structure the base of the descriptors of the protected documents, enabling the searches to be made efficiently.

2. Contents Descriptors

Classically, descriptors of documents are large-sized digital vectors with which a measurement of similarity (often a distance) is associated. This measurement of similarity is used to quantify the resemblance between two documents in measuring the proximity between their descriptors. In particular, these descriptors have to be robust to the deterioration of the documents.

In the field of video content analysis, it is chiefly a description based on key images that is used. This technique consists in selecting a subset of images, called key images, on the basis of the video content and describing these key images. Two approaches can be distinguished:
  local approaches: on the basis of each key image, a set of points of interest is selected in the image. A descriptor is then computed about each point of interest;
  comprehensive approaches: each key image is described as a whole by computing a single descriptor.

The detection of video copies therefore corresponds to the detection of image copies coming from a same video source in a consistent temporal order. In other words, placing a copied video document in correspondence with the original video document amounts to placing the descriptors of the key images of the two documents in correspondence by verifying the temporal consistency of the key images placed in correspondence. This approach is described especially in the document by A. Joly et al, "*Statistical similarity search applied to content-based video copy detection*" (icdew, p. 1285, 21st International Conference on Data Engineering Workshops (ICDEW'05), 2005).

Most techniques for analyzing a multimedia content use a local description based on interest points for the description of the key images, assuming that local descriptors are more robust than comprehensive descriptors. Furthermore, the information describing the multimedia content is distributed among various regions of the image. Consequently, the deterioration of some of these regions (for example during the overlay of a logo in an image or else during image cropping, do not affect the other regions used to identify the document.

These local descriptors are very costly in terms of both storage and execution time of the requests. Indeed, the description of an image by several descriptors firstly, on the one hand, entails an increase of the same order in the size of the base of the descriptors relative to a comprehensive scheme of descriptors and, on the other hand, increases the cost of a search. Indeed, for retrieving the original image from a request image, it is needed to search for descriptors similar to each of the local descriptors of the request image and then integrate all the results.

The problem of the cost of the search also affects comprehensive description techniques, especially when the size of the base of the descriptors of protected contents is voluminous.

Furthermore, taking into account the temporal consistency of the key images can be done only after the processing of the entire suspect content, or of a certain (arbitrarily set) number of its key images.

SUMMARY

The disclosure proposes a novel solution in the form of an analysis method for analyzing a multimedia content, constituted by a temporal succession of elementary entities, aimed at checking on whether or not the multimedia content includes a portion of at least one reference content referenced in a base of reference contents.

According to the disclosure, such an analysis method comprises the following steps for at least one elementary entity, of the multimedia content that is to be analyzed, and that is selected according to a predetermined selection rule, called a current elementary entity:

allocating a likelihood probability to each elementary entity of a set of current candidate elementary entities, said likelihood probability taking into account a similarity between said candidate elementary entity and said current elementary entity of said multimedia content;

allocating a transition probability between said current candidate elementary entity or entities and at least one previous candidate elementary entity;

allocating an identification probability of at least once scenario formed by a temporal succession of candidate elementary entities, taking into account:
the likelihood probabilities allocated to the candidate elementary entities of said scenario; and
the transition probabilities allocated to the candidate elementary entities of said scenario;

deciding to recognize one of said reference contents and/or to continue the analysis by means of a following elementary entity of said multimedia content, as a function of said identification probability.

The disclosure thus proposes a novel and inventive approach based on a probabilistic approach, making it possible especially to detect on the fly, i.e. when reading or analyzing the multimedia content, whether it contains contents or portions of contents contained in a reference base.

In particular, the probability of identifying a scenario does not take into account solely the similarity of an elementary entity at a given point in time (through the likelihood probability) but also considers the previous similar elementary entities, through the taking into account of transition probabilities.

This approach makes it possible to analyze a multimedia content in real time without waiting for the entire content to be processed. Indeed, if the transition probability is high, and if the likelihood of the current elementary entity confirms this transition, then the decision to recognize can be validated. Thus, it is not necessary to analyze the whole suspect multimedia content to detect any copies that may be present in this content.

The disclosure also enables the analysis to be made after the event, if the application in view does not require that the decision be taken on the fly.

For example, the decision to recognize can be taken when the identification probability of a scenario or a subset of this scenario is above a predetermined threshold.

Certain elementary entities of the multimedia content to be analyzed are therefore selected according to a predetermined selection rule: for example, one elementary entity is selected regularly (every five elementary entities).

These elementary entities correspond for example to images if the multimedia content to be analyzed is a video content or to audio frames if the multimedia content to be analyzed is an audio content.

In particular, the candidate elementary entities belong to the group comprising:
an elementary entity belonging to one of said reference contents and
an elementary entity representing a content known as a "free" or non-copyright content non-referenced in said reference base.

In other words, the step for allocating a likelihood probability may allocate a probability to a candidate elementary entity belonging to one of the reference contents and/or to a candidate elementary entity belonging to a content not referenced in the reference database.

Similarly, the step for allocating the transition probability may take into account elementary entities belonging or not belonging to a reference content.

Consequently, a scenario, formed by defining a temporal succession of candidate elementary entities may comprise both elementary entities belonging to a reference content and elementary entities belonging to a free content.

Thus the disclosure maintains detection hypotheses that are not preponderant in principle but could subsequently become so.

In particular, the step for deciding on recognition recognizes at least one portion of one of the reference contents or the free content.

Thus, during the analysis of the multimedia content, it is possible to detect that a portion of the content to be analyzed corresponds to a non-referenced content while another portion of the content to be analyzed corresponds to a referenced content.

According to one particular aspect of the disclosure, the step for allocating a likelihood probability takes into account a comparison between a descriptor of the current elementary entity and a descriptor of the candidate elementary entity.

Such a descriptor comprises for example a unique comprehensive descriptor describing the entire elementary entity, or a plurality of local descriptors, each describing a part of the elementary entity.

For example, if the multimedia content is a video content, the comprehensive descriptor describes the image with which it is associated and the local descriptors each describe points of interest of the image. These descriptors take for example the form of color histograms, contour histograms etc.

If the multimedia content is an audio content, the descriptors are for example cepstral coefficients (for example MFCC or Mel frequency cepstral coefficients) computed on audio frames.

According to one particular characteristic of the disclosure, the step for allocating a transition probability allocates, to each current candidate elementary entity, a probability belonging to the group comprising:
a first transition probability ($P_c$) that the current candidate elementary entity and that a previous candidate elementary entity belong to a same reference content;

a second transition probability ($P_O$) that the current elementary candidate entity and that a previous candidate elementary entity belong to different reference contents;

a third transition probability ($P_{nc}$) that the current candidate elementary entity belongs to a free content, not referenced in the reference base, and that a previous candidate elementary entity belongs to a reference content;

a fourth transition probability ($P_{cnc}$) that the current candidate elementary entity and that a previous candidate elementary entity belong to a free content, not referenced in the reference database;

a fifth transition probability that the current candidate elementary entity belongs to a reference content and that a previous candidate elementary entity belongs to a free content, not referenced in the reference base.

For example, the first transition probability is greater than or equal to the third transition probability which is itself greater than or equal to the second transition probability.

Such a distribution of transition probabilities gives a good performance.

According to another aspect of the disclosure, the scenarios are represented in the form of a tree associating the set of previous candidate elementary entities with each of the current candidate elementary entities, the step for allocating a likelihood probability allocating a likelihood probability to each of the nodes of the tree, and the step for allocating a transition probability allocating a transition probability to each of the branches of the tree.

One scenario, formed by a temporal succession of candidate elementary entities, therefore defines a consistent route in the tree, from a root node to a tip of the tree. The identification probability of a scenario then corresponds to the product of the likelihood probabilities allocated to the different nodes and the transition probabilities allocated to the various branches forming the scenario.

According to another characteristic of the disclosure, the analysis method comprises a step for selecting a subset of the most probable scenarios.

For example, the selecting step selects the scenarios having an identification probability above a predetermined threshold (for example above 0.75).

According to one variant, the selecting step selects the N scenarios having the highest identification probabilities, with N as a positive integer (for example N=20).

It is also possible to reduce the number of scenarios envisaged by only keeping, for a current elementary entity, the current candidate elementary entities belonging to a same referenced content which is identified by a previous candidate elementary entity, as well as the current candidate elementary entities belonging to a non-referenced content.

In particular, the step for deciding on recognition recognizes a portion of one of the reference contents or of a free content when the corresponding part of said tree comprises a single branch.

In other words, when all scenarios share a common branch between two successive candidate elementary entities, the content (reference content or free content) identified at the ends of this branch is deemed to be recognized.

In particular, this decision to recognize may be done in a deferred manner, after analyzing the whole content considered, or else on the fly, i.e. in real time as soon as a single branch is detected.

For example, if the processing is deferred, then a Viterbi algorithm can be used to determine the most probable scenario.

Such an analysis method can be implemented in a merging module. Such a merging module makes it possible especially to make good use of the temporal consistency expected between the results of successive searches corresponding to consecutive elementary entities.

Another embodiment of the disclosure pertains to a computer program product downloadable from a communications network and/or recorded on a computer-readable carrier and/or executable by a processor, comprising program code instructions for implementing the analysis method described here above.

Another aspect of the disclosure pertains to a device for analyzing a multimedia content, constituted by a temporal succession of elementary entities, making it possible to check on whether or not the multimedia content includes a portion of at least one reference content referenced in a base of reference contents.

According to the disclosure, such a device comprises, for at least one elementary entity of the multimedia content that is to be analyzed and that is selected according to a predetermined selection rule, called a current elementary entity:

means for allocating a likelihood probability to each elementary entity of a set of current candidate elementary entities, said likelihood probability taking into account a similarity between said elementary candidate entity and said current elementary entity of said multimedia content;

means for allocating a transition probability between said current candidate elementary entity or entities and at least one previous candidate elementary entity;

means for allocating an identification probability of at least once scenario formed by a temporal succession of candidate elementary entities, taking into account:

the likelihood probabilities allocated to the candidate elementary entities of said scenario; and the transition probabilities allocated to the candidate elementary entities of said scenario;

means for deciding to recognize one of said reference contents and/or continue the analysis by means of a following elementary entity of said multimedia content, as a function of said identification probability.

Such an analysis device is especially adapted to implementing the analysis method described here above. It is for example an analysis server enabling the exchange or downloading of multimedia contents.

BRIEF DESCRIPTION OF THE DRAWINGS

Other features and advantages of the disclosure will be more clearly evidenced when reading the following description of a particular embodiment, given as an example, only illustrative and not limiting, and the annexed drawings, wherein:

FIG. 3 illustrates the structure of a video content to be analyzed;

FIG. 5 proposes an example of an analysis result of a multimedia content; and

FIG. 6 presents the structure of a device for analyzing implementing a technique for analyzing a multimedia content according to the disclosure.

DETAILED DESCRIPTION OF ILLUSTRATIVE EMBODIMENTS

1. General Principle

The general principle of the disclosure relies on the use of a probabilistic approach to analyze a multimedia content, i.e. to check that this multimedia content does or does not comprise referenced contents in a base or portions of these referenced contents.

More specifically, the disclosure proposes to formulate assumptions, also called scenarios, on the presence and identity of a reference content in a multimedia content to be analyzed, this being done possibly as and when the multimedia content is read. The probability of the different assumptions envisaged is computed and updated when a new selected elementary entity of the multimedia content is taken into account. Certain assumptions are confirmed and others are invalidated at each new selected elementary entity, only the most probable ones being kept.

For example, this probabilistic approach is used to control the multimedia contents made available to the users on a server, by efficiently detecting the presence of copies of one or more reference contents within a multimedia content, as and when this multimedia content is read.

In particular, the present disclosure is used to identify an integral copy in the multimedia content controlled before the complete reading of this content (for example, the analyzed video is a copy of an entire protected video), or to identify a segment extracted from a reference content on the fly and know the precise start and end of the copied segment in the analyzed stream after only a few instants of reading.

The disclosure can thus be integrated into an automatic system of copyright protection. For example, on a content exchange hub, such as Youtube, MaZoneVidéo, Dailymotion, etc (registered marks), it enables action far upstream of the process for filing multimedia contents (image, audio or video contents) by filtering the filed illicit documents and thus put itself in compliance with copyright protection rules. Indeed, according to the technique proposed, it is possible to start checking a content as soon as it starts being loaded onto an exchange hub, making it possible for example to preserve network resources by interrupting the filing of the video if it is recognized as an illicit copy.

Furthermore, and again in the context of content exchange hubs, a system of this kind can be used to detect multiple copies of a same document referenced in a base of the server. Indeed, one and the same document is generally loaded by several users with different names and textual descriptions. A technique of analysis according to the disclosure can thus be applied to eliminate duplicates in the base. Thus, the users are presented with a unique occurrence of each document (possibly with a link to the other copies).

The disclosure can also be used for purposes of analysis and summarizing of content whose broadcasting is authorized but for which it is sought to know the audience.

Figure 1:
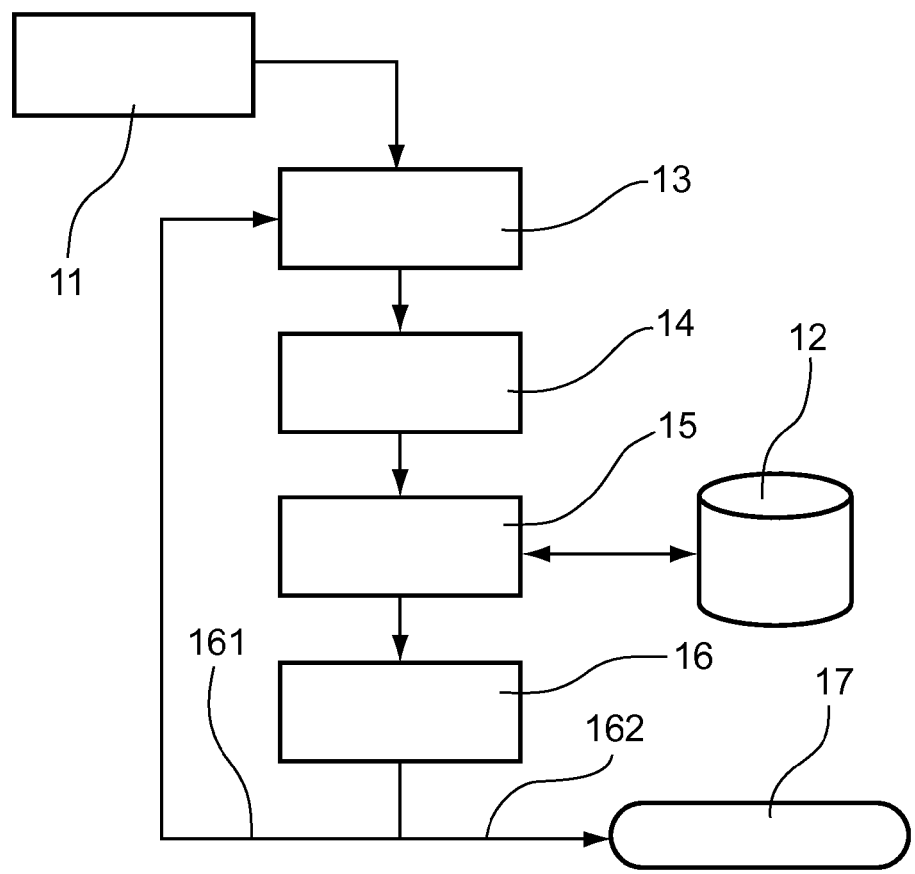
FIG. 1 presents a general principle of the analysis of a multimedia content.

FIG. 1 gives a more precise illustration of the general principle of the analysis of the multimedia content, making it possible to check whether a multimedia content 11, organized in successive elementary entities, comprises at least one portion of at least one of the reference contents referenced in a reference base 12.

It is deemed to be the case, for example, that analysis has to be done on a video content 11 in which the successive elementary entities correspond to images and that the reference contents referenced in the base 12 are reference video contents in which the successive elementary entities also correspond to images.

It is also deemed to be the case that the key images have been computed on reference contents of the reference base 12. These key images are indexed in a fixed images base by a classic indexation method, each image being identified by a video file and a time index of the corresponding frame. The key images can for example be extracted from the video according to a regular temporal sampling or they can be built on the basis of an analysis of the content of the images of the video.

Naturally, the disclosure is not limited to the analysis of video content but concerns the analysis of multimedia contents with a temporal dimension in general (i.e. contents constituted by a temporal succession of elementary entities). For example, the elementary entities of an audio content are temporal samples or frames.

More specifically, during the reading or downloading of the video content 11, certain images 13 of the video content, known as key images, are selected, enabling a description of the visual content of the video, by using the same technique as the one used for the reference contents.

For each current key image 13, first a computation (14) is made of one or more descriptors, depending on whether a comprehensive or local approach is used, as described with reference to the prior art.

At each key image 13 of the analyzed video, a request to the reference base 12 sends back a set of candidate images (zero, one or more images) which are potentially similar to the analyzed key image 13. More specifically, the descriptors of the current key image is/are compared (15) with known descriptors, describing the reference content referenced in the reference base 12. Thus are detected images of reference contents of the base 12 which are close to the key images 13 of the video content 11 to be analyzed. These images are called candidate images.

Each candidate image is accompanied, as the case may be, by a score representing its degree of similarity with a key image 13. The result of the search is generally approximated, because the search by similarity in the reference base is approximative and/or because the images are potentially deteriorated.

In particular, this less precise but swifter search reduces the cost of the search to a greater and more significant extent.

Thus, among the candidate images, it is possible to have several false alarms.

Similarly, if the query image effectively corresponds to an image of the base, this does not necessarily means that it is always detected, but only that it is detected with a given detection probability. If the search in the base sends back no candidate image, it may be either that the image is not in the base or that it is in the base but that it has not been found by the search procedure.

These candidate images are then processed by a module for merging results of searches based on key images 16. This merger module 16 is used especially, by taking into account the temporal consistency between the candidate images associated with each key image, to detect if the video stream 11 is a copy of a reference content of the base 12. It also makes it possible to eliminate non-detections and candidate images corresponding to false alarms, by taking into account the temporal consistency of the successive images, and to compensate for the precision loss due to this approximate search.

More specifically, at output of the merger module 16, it is possible to continue the analysis 161 of the video content 11 by studying the following key image of the video content or else by deciding to interrupt the analysis 162, after the recognition of an illicit copy.

At each new key image of the video content 11, a set of p possible scenarios is updated as a function of the most probable transitions and of new candidate images and probabilities allocated to these images. A scenario corresponds to a sequencing of referenced or non-referenced (i.e. free or non-copyright) video segments in the reference base. The scenario is a possible chronology of the video segments present in the video to be controlled from its first image up to the current image.

For example, if an illicit copy is detected, the module 17 is used to interrupt the downloading of the copy and/or inform a competent authority.

In particular, the disclosure is implemented at the level of the merger module 16 and makes it possible especially to:
- detect copies of short-life extracts;
- perform detections on the fly;
- interrupt the search as soon as a detection is proven (i.e. consolidated by the merger module), enabling a further reduction of search time.

Figure 2:
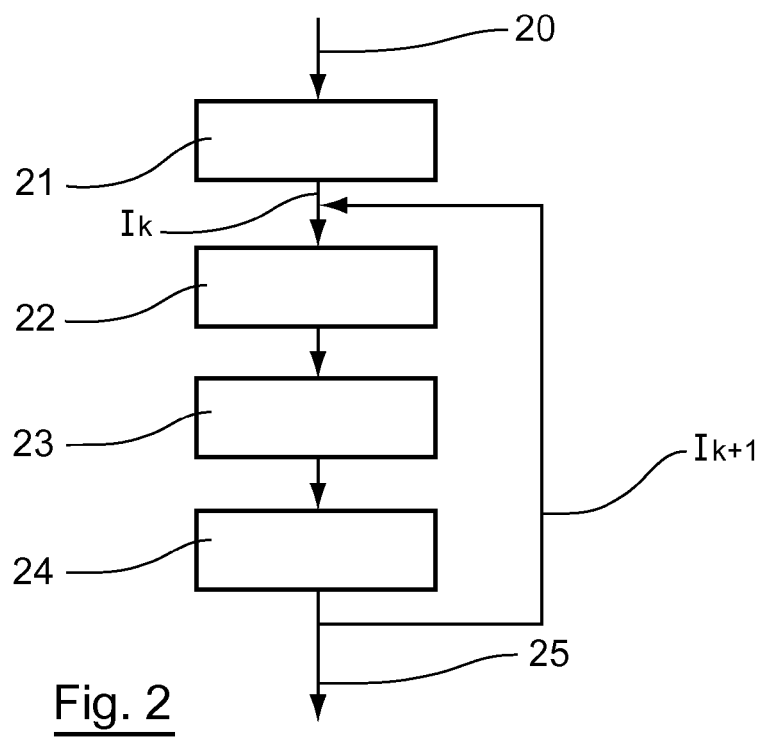
FIG. 2 illustrates the main steps of the analysis method according to the disclosure.

FIG. 2 provides a more precise illustration of the main steps of the analysis method according to the disclosure, implemented for the analysis of a multimedia content 20 (audio, video, images etc) aimed at checking to see whether or not the multimedia content 20 comprises at least one portion of at least one reference content referenced in the reference content base.

Such a procedure according to the disclosure can be implemented in various ways, especially in a wired form or in software form.

More specifically, the multimedia content 20 is organized into successive elementary entities (for example images or samples or audio frames) from which certain elementary entities to describe the multimedia content are selected (21).

For each selected elementary entity $I_k$ of the multimedia 20, called a current elementary entity, the method of analysis implements different steps.

During a step 22, a likelihood probability is allocated to each elementary entity of a set of current candidate elementary entities.

For example, the candidate elementary entities belong to a reference content referenced in a reference base or to a content known as a free or NC (non-copyright) not present in said reference base.

The likelihood probability takes into account a similarity between the candidate elementary entity and the current elementary entity $I_k$ of the multimedia content 20.

For example, a likelihood probability $Pv_1^k$ is allocated to the candidate elementary entity $I_1^k$ coming from a reference content $f_1$, a likelihood probability $Pv_2^k$ to the candidate elementary entity $I_2^k$ coming from a reference content $f_2$, and a likelihood probability $Pv_{NC}^k$ to a non-referenced free content NC where the exponent k indicates the fact that the elementary entity is a candidate for the $k^{th}$ elementary entity $I_k$ of the analyzed content.

The closer (the more similar) the candidate elementary entity is to the current elementary entity, the higher the likelihood probability.

During a step 23, a transition probability is allocated between said current candidate elementary entity or entities and at least one previous candidate elementary entity (except for the first selected elementary entity of the multimedia content).

For example, the following are allocated:
- a first transition probability (Pc) that a current candidate elementary entity and a previous candidate elementary entity belong to a same reference content, or
- a second transition probability ($P_0$) that a current candidate elementary entity and a previous candidate elementary entity belong to different reference contents, or
- a third transition probability (Pnc) that a current candidate elementary entity belongs to a free content and a previous candidate elementary entity belongs to a reference content, or
- a fourth transition probability (Pcnc) that a current candidate elementary entity and a previous candidate elementary entity belong to a free content, or
- a fifth transition probability that a current candidate elementary entity belongs to a reference content and a previous candidate elementary entity belongs to a free content.

During a following step 24, an identification probability is allocated to at least one scenario formed by a temporal succession of candidate elementary entities taking into account the:
- the likelihood probabilities allocated to the candidate elementary entities of said scenarios; and
- the transition probabilities allocated to the candidate elementary entities of said scenario.

For example, it is considered to be the case that, for the previous selected elementary entity of the multimedia content 20, an identification probability $w^{k-1}$ had been allocated to one of the scenarios that can be envisaged $(I_1^0, \ldots, I_1^{k-1})$.

For the current elementary entity $I_k$ of the multimedia content 20, a possible scenario is defined for example by the candidate elementary entities $I_1^0, \ldots, I_1^{k-1}, I_1^k$, another one is defined by the candidate elementary entities $I_1^0, \ldots, I_1^{k-1}, I_2^k$, and yet another one is defined by the candidate elementary entities $I_1^0, \ldots, NC, NC$, etc.

At step 24, an identification probability is allocated to each of these scenarios.

For example, the identification probability of the scenario $I_1^0, \ldots, I_1^{k-1}, I_1^k$, denoted $w^k$, is equal to the product of the identification probability at the previous instant $w^{k-1}$ of the scenario $I_1^0, \ldots, I_1^{k-1}$, of the likelihood probability of the elementary entity $I_1^k$ and of the transition probability between the elementary entities $I_1^{k-1}$ and $I_1^k$, denoted $Pt(I_1^k/I_1^{k-1})$:

$$w^k = w^{k-1} \times Pt(I_1^k/I_1^{k-1}) \times Pv_1^k$$

For the first selected elementary entity of the multimedia content, the identification probability of a scenario may be considered to be equal to the likelihood probability of the corresponding candidate image.

Finally, depending on the identification probabilities of the different possible scenarios, the method can take a recognition decision 25 to recognize a reference content (or a portion of this content), for example the reference content $f_1$ if the identification probability of the scenario $I_1^{k-1}, I_1^k$ is greater than a predetermined threshold or is predominant relative to the identification probabilities of the other scenarios. It is thus possible to detect on the fly, i.e. during the reading or analysis of the multimedia content, that this content comprises at least one portion of a referenced content.

If not, it is possible to continue the analysis of the multimedia content 20 by looping back on steps 22, 23 and 24 described here above for a new selected elementary entity $I_{k+1}$ of the multimedia content 20.

2. Example of an Implementation for the Analysis of Video Contents

An example of an implementation of the disclosure in an analysis device (for example a server) for the detection of video copies is now presented.

It is recalled again that the disclosure can also be applied to the analysis of other types of multimedia contents, for example audio contents.

Let Q denote the multimedia content to be analyzed. As indicated here above, the problem of the detection of copies consists in searching for the video or videos stored in a reference base, of which the video to be analyzed Q could be a copy. According to this example, elementary entities of the video Q are selected as illustrated in FIG. 3, these entities corresponding to key images. The key images may for example be extracted from the video Q according to a regular temporal sampling or they may be built on the basis of an analysis of the content of the images of the video Q.

As illustrated in FIG. 3, it is deemed to be the case for example that the key images 31, 32, 33, 34 of the video Q occur respectively at the instants $t_0$, $t_1$, $t_2$, and $t_k$.

Detecting the copies amounts to bring each of these key images into correspondence with an image of video content referenced in a base of reference contents or with a "fictitious" video if the key image of the video to be analyzed is not described in the reference base.

In other words, the quantity sought at the instant $t_k$, corresponding to a key image of the video to be analyzed Q, is a magnitude $x_k$ which may take the following values:

- either a pair $(f, D_t)$, where f is the number of the recognized reference content of the reference base, and $D_t$ is the temporal shift between the instant $(t_k)$ of the video content to be analyzed Q, corresponding to a key image, and the instant $(t'_0)$ of the video content referenced f, corresponding to a recognized image. For example, if we consider the example illustrated in FIG. 3, we have $D_t = t_k - t'_0$;
- or a predetermined value, for example the value "NC" for "non-copyright" when the key image of the video content to be analyzed Q at the instant $t_k$ is not put into correspondence with any key image present in the reference base. In other words, the magnitude $x_k$ can take the value NC when the sub-sequence of the video to be analyzed Q around the key image at the instant $t_k$ does not correspond to any video referenced in the reference base.

The magnitude $x_k$ is here below named "an instantaneous state". More specifically, this magnitude corresponds to a concealed state, using the terminology defined by the Markov series, since there is no direct access to this magnitude.

Given the temporal link (temporal consistency) existing between two successive instantaneous states $x_{k-1}$ and $x_k$, corresponding to two consecutive key images of the video to be analyzed Q, the disclosure takes into account the chronology of the instantaneous states from the initial instant of start of the analysis (for example the instant to), up to the current instant (for example the instant $t_k$). This chronology (also called a scenario) $x_{0:k}$, corresponding to the concatenation of the instantaneous states is denoted as $x_i$ for i ranging from 0 to k.

This magnitude $x_{0:k}$ is not directly known but a search for descriptors in the reference base gives an observation of these magnitudes. It must be noted however that this observation process is noisy chiefly for two reasons:

- the copied video may have been deliberately degraded so as to make it hard to recognize or unintentionally degraded for editorial reasons or because of transcoding effects;
- the search by similarity in the reference base gives results that may be imprecise and/or imperfect. These cases of lack of precision or imperfections are due chiefly to the limitations of the descriptors of the key images and the lack of precision introduced during the search by similarity to accelerate the searches.

In other words, the search in the reference base can give rise to non-detections, meaning that the key image of the video to be analyzed Q is found in the reference base but has not been detected during the search, and to false alarms, meaning that the search sends back candidate images while the video to be analyzed is not a copied video.

More specifically, an observation at an instant $t_k$ may take the form of a set $Z_k$ of m values $z_{ik}$, for i=1 ... m, each $z_{ik}$ value sending back a key image of a reference video in the reference base. As in the case of the states $x_k$, an observation corresponds to a pair $(f D_t)$, where f is the number of the reference contents recognized in the reference base, and $D_t$ is the temporal shift between the temporal index of the video to be analyzed and that of the corresponding image recognized in the video content f.

In particular, it is possible to associate a score with each value $z_{ik}$ that corresponds to the degree of confidence granted to the result of the search by similarity in the reference base.

The approach used according to the disclosure is based on the principle of the Bayesian inference in the concealed Markov series. In particular, this is a Bayesian filtering problem.

Owing to the existing uncertainty over the value of the scenario sought, the problem is considered in probabilistic terms. It is therefore sought to establish the distribution of probabilities of the chronology of the states $x_{0:k}$, knowing the observations $Z_{o:k}$. The term $p(x_{0:k}|Z_{0:k})$ denotes this distribution.

As in the particular filtering approach, this distribution is represented by samples (corresponding to possible scenarios), the samples being weighted by their identification probability assessed by the disclosure. This set of samples is therefore the set $\{(x_{o:k}^{(j)}, w_j), j=1 \ldots N\}$ where:

- each weight $w_j$ corresponds to the probability that the real scenario is the scenario $x_{o:k}^{(j)}$, knowing the observations, i.e. the identification probability associated with this scenario;
- N is the number of scenarios considered.

The approach proposed according to the disclosure is iterative, in the sense that it can be repeated for several successive elementary entities (key images), for example at the instants $t_0$, $t_1$, $t_2$, $t_k$, etc, and that, at each step, the set of the possible scenarios is updated on the basis of the set of scenarios assessed at the previous step.

Thus, the distribution $p(x_{0:k}|Z_{0:k})$ is computed from samples representing $p(x_{0:k-1}|Z_{0:k-1})$. One uses the expression coming from Bayes's law in probabilities which gives:

$$p(x_{0:k} | Z_{0:k}) = \frac{p(Z_k | x_k) p(x_{0:k} | Z_{0:k-1})}{p(Z_k | Z_{k-1})}. \tag{1}$$

More specifically, the method according to the disclosure can be formalized in two phases (according to the terminology used in Bayesian filtering):

a phase known as a prediction phase, in which the samples at the instant $t_{k-1}$ are propagated up to the instant $t_k$ without taking into account the observations at the instant k (i.e. without taking into account the new candidate images coming from the search at the instant $t_k$). This is the evaluation of $p(x_{0:k}|Z_{0:k-1})$;

a correction phase, in which the weight of the samples is modified by the magnitude $p(Z_k|x_k)$, called data likelihood. This likelihood probability corresponds to the probability of the observations, the state being known.

In particular, it can be noted that it is not necessary to assess the denominator of the expression (1) because it affects in a same way all the samples considered and actually plays the role of a standardization constant (in order the sum of the weights of the samples to be equal to 1).

A) Prediction of the Samples

Here below, the phase of prediction of the possible scenarios (also called samples) is described in greater detail.

It is assumed that a set of samples $\{(x_{o:k-1}^{(j)}, w_j), j=1\ldots N\}$ are available at the instant $t_{k-1}$. During the prediction phase, each sample is propagated according to a dynamic which expresses the probability of passing from the instantaneous state $x_{k-1}$ to the instantaneous state $x_k$. Formally, each sample $x_{o:k-1}^{(j)}$ generates one or more samples representing $p(x_k|x_{o:k-1}^{(j)})$. Different expressions may be envisaged for this dynamic, depending on the application in view. For example:

if the instantaneous state $x_{k-1}$ points to a reference content of the base, in other words if $x_{k-1}=(f, D_t)$ at the instant $t_{k-1}$, then it will travel in transit towards:

the instantaneous state $x_k=(f, D'_t)$ at the instant $t_k$ with a probability $P_c=W_c/S_w$, assuming that the magnitudes $D_t$ and $D'_t$ are temporally consistent: in this case, the operation is continued with the same reference content f of the base;

the instantaneous state $x_k=(f', D'_t)$ at the instant $t_k$ with a probability $P_o=W_o/S_w$, taking f' to be different from f and/or $D'_t$ and $D_t$ non consistent: in this case, one has a transition from the reference content f to another reference content f' of the base or towards a segment of f that is disjoint from the previous one;

the instantaneous state $x_k$=NC at the instant $t_k$ with a probability with $P_{nc}=W_{nc}/S_w$: in this case, there is a transit from the reference content f to a non-referenced video of the base, denoted as NC, if the instantaneous state $x_{k-1}$ points to a content that is not referenced in the base, in other words if $x_{k-1}$=NC at the instant $t_{k-1}$, then it will travel in transit towards:

the instantaneous state $x_k$=NC with a probability $P_{cnc}=W_{cnc}/S'_w$: in this case, the operation is continued with the same non-referenced NC content or with another non-referenced content;

any referenced content whatsoever of the reference base with the probability $W_o/S'_w$, with:

$W_o$, $W_{nc}$, $W_c$ and $W_{cnc}$ of the fixed parameters;

$S_w$ and $S'_w$ are standardization constants such that $S_w=W_c+(n-1)W_0+W_{nc}$ and $S'_w=W_{cnc}+nW_o$, where n corresponds to the number of key images indexed in the reference base;

In particular, several techniques can be used to evaluate the notion of temporal consistency between the magnitudes $D_t$ and $D'_t$. For example, a simple method consists in checking whether it is possible to write $D_t=D'_t\pm\epsilon$, with $\epsilon$ being a fixed and low tolerance threshold. Other more elaborate approaches taking into account the uncertainty of positioning of the key images can also be implemented.

According to one particular embodiment of the disclosure, the parameters $W_o$, $W_{nc}$, $W_c$ and $W_{cnc}$ are chosen such that: $W_o<W_{nc}<W_{cnc}<W_c<n$.

The magnitudes $P_c$, $P_o$, $P_{nc}$, $P_{cnc}$ are transition probabilities for the different examples here above. In particular, the magnitude $P_c$ is a probability of continuity towards a key image in the continuity of the previous image, i.e. belonging to the same reference content (if it is not non referenced). The user can especially regulate this magnitude as a function of the type of videos that he wishes to identify: if it is known that the analyzed videos are full copies, this magnitude could be high, while, if it is known that they were previously constituted by a succession of extracts of different videos belonging to the base, this parameter could be smaller.

B) Correction of the Samples

The correction (i.e. the modification of the weight of the samples) is done by comparing the predicted samples (coming from the prediction phase) with the observations obtained from the search by similarity in the reference base at the instant $t_k$.

If the different candidate images constituting the set of observations at the instant $t_k$, are accompanied by scores (coming from a voting process for example), it is possible to express a probability of an individual false alarm Pfa at each image (and hence at each element $z_{ik}$) depending on this score. These scores represent a value of confidence associated with the candidate image. For example, the following formula can be used:

$$Pfa=\exp(-A(s-s_0))$$

where:

s is the score associated with a candidate image;

$s_0$ is the threshold from which the images are considered to be rightful candidates (for example, among the n key images of the reference base, m images are chosen for which the similarity with the key image of the video to be analyzed is above the threshold $s_0$); and A is a positive constant.

If, conversely, the various candidate images are not accompanied by scores, the same probability of a false alarm can be given to all the candidate images.

It is therefore sought to compute a likelihood probability $p(Z_k|x_k^{(j)})$, the exponent j being the number of the sample considered.

The following magnitudes may be chosen:

if the instantaneous state $x_k^{(j)}$ corresponds to one of the candidate images of the set $Z_k$ (for example the $l^{th}$ observation $z_{lk}$), then the likelihood probability is equal to:

$$p(Z_k|x_k^{(j)}) = (1-pfa(z_{lk}))\prod_{\substack{i=1\\i\neq l}}^{m} pfa(z_{ik}) \qquad (2)$$

Indeed, it is needed that the observation l not to be a false alarm and that all the other observations be false alarms. If $Z_k$ contains only this value, the product is replaced by 1.

if the instantaneous state $x_k^{(j)}$ is not in the set $Z_k$, then the likelihood probability is equal to:

$$p(Z_k|x_k^{(j)}) = (1.-Pd)\prod_{i=1}^{m} pfa(z_{ik}) \qquad (3)$$

For it is necessary that the state should not have been detected (probability 1−Pd, if Pd is the probability of detection inherent in the system of search in the base) and that all that was detected were false alarms. If the set $Z_k$ is empty, the product is replaced by 1.

if $x_k^{(j)}$ does not correspond to a key image of the reference base (i.e. $x_k^{(j)}$=NC), then all the observations of the set $Z_k$ should be false alarms. The likelihood probability is then:

$$p(Z_k \mid x_k^{(j)}) = \prod_{i=1}^{m} pfa(z_{ik}) \qquad (4)$$

or 1 if the set $Z_k$ is vacant (m=0).

C) Example of Representation

A set of weighted scenarios, which will represent possible assumptions of chronologies, will be therefore stored. At the first key image, this set is initialized with the m observations made as well as an additional observation NC corresponding to the assumption of the observation of a video not referenced in the base.

These samples are weighted by the likelihood probability of each observation computed according to the equations (2) and (4) above.

In a Monte Carlo type approach, it is possible to add scenarios to this initialization coming from a random draw on the instantaneous states in order to complement the set of scenarios and assign them a weight coming from the equation (3). This amounts to adding observations to the set $Z_k$ randomly drawn from the videos of the reference base.

Once initialized, the set of samples is propagated up to the next instant. Each sample can give rise to several samples at the next instant. These new samples are initially allocated a weight as a function of the defined prediction law.

It is then possible to make all the transitions to all the possible images of the base and to the image NC, and update the weights as a function of the following observations. This leads to a large number of scenarios.

A Monte Carlo type alternative consists in randomly drawing some of these scenarios as a function of their probability of appearance.

Another alternative consist in selecting a set of scenarios having high chances of leading to a major identification probability. Thus, at each prediction, the transition to another content is considered only if this content is in all the observations at the next instant.

For example, it is assumed that the following observations will be received at the successive instants $t_0$, $t_1$ and $t_2$:

| Instant $t_0$ | Instant $t_1$ | Instant $t_2$ |
|---|---|---|
| f1 | f1 | f2 |
| f2 |  | f3 |

In this example, the videos appearing several times are also assumed to appear consistently, i.e. with proximate magnitudes $D_r$. For reasons of simplifications of writing, these values $D_r$ are not noted.

Figure 4A:
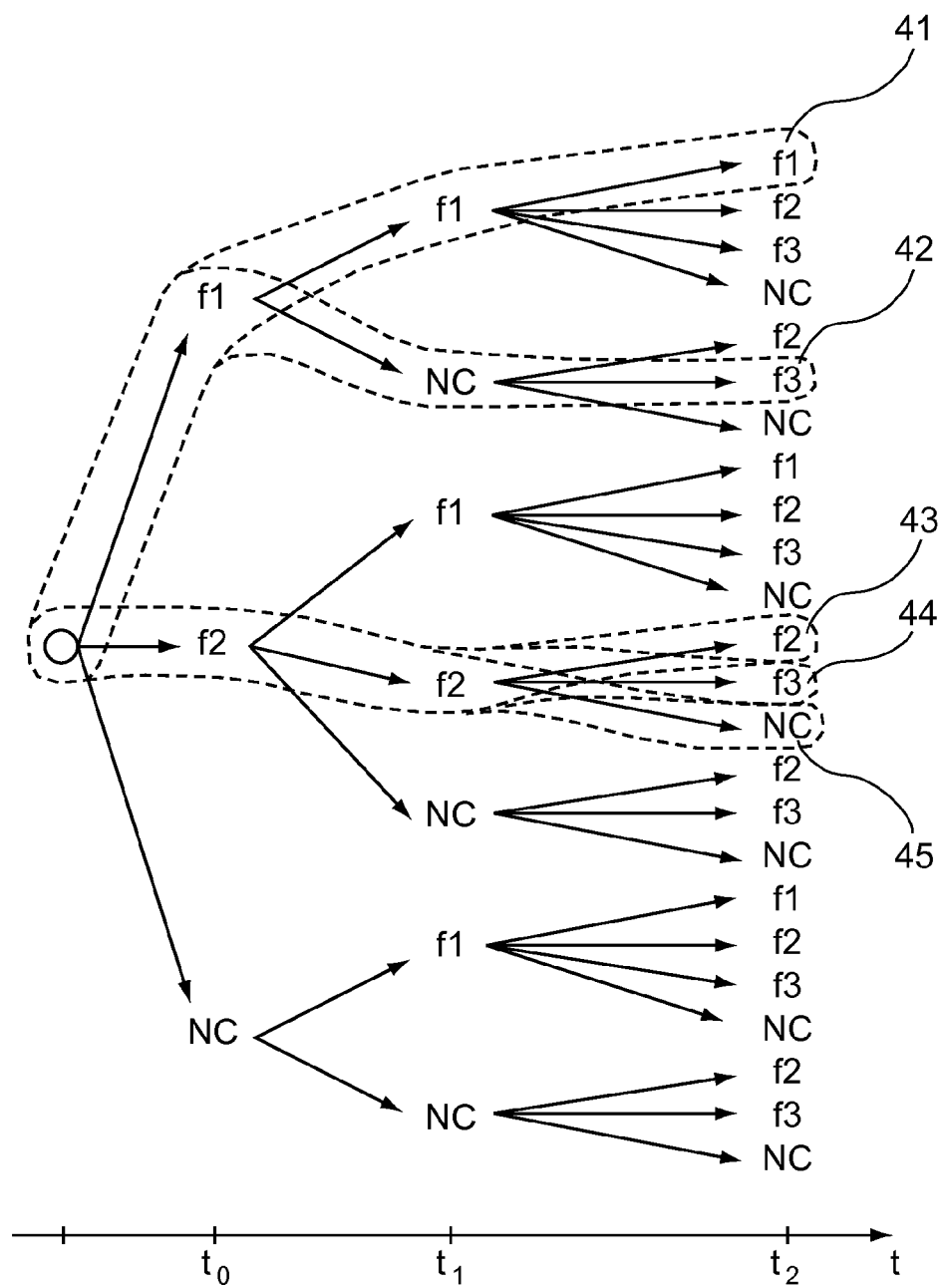
FIGS. 4A and 4B present the different scenarios that can be envisaged, in the form of a tree, during the analysis of a multimedia content.

FIG. 4A is an illustration in tree form of the different examples taken into account in compliance with the above rule.

More specifically, it is recalled that a scenario is formed by following a branch of the tree from the root up to a leaf. For example, the paths 41 to 45 define distinct scenarios.

The identification probability of a scenario can be computed by using the computation rules set forth here above.

For example, the probability of the scenario 41 corresponds to:
the likelihood probability of the reference video f1 at the instant $t_0$ multiplied by
the transition probability to a same temporally consistent content (continuity) between the instants $t_0$ and $t_1$, multiplied by
the likelihood probability of the reference video f1 at the instant $t_1$, multiplied by
the transition probability of continuity between the instants $t_1$ and $t_2$, multiplied by
the likelihood probability of the reference video f1 at the instant $t_2$.

In other words, the scenario 41 consists in studying the possibility that the analyzed video corresponds to the video f1 of the reference base at the three successive instants $t_0$, $t_1$ and $t_2$.

It can be noted in this FIG. 4A that, even for a very limited case as in this example, the number of scenarios can become great after a small number of key images analyzed.

According to one variant, the number of scenarios envisaged can be reduced by noting that two scenarios ending (for example at the instant $t_2$) with the same key image will have a common fate, i.e. they will always be affected by the same coefficients if they are extended to future instants by the same images. Thus, if one of them is more probable than the other, it will always remain so. It is therefore possible to eliminate the less probable scenarios among these two scenarios (for example in FIG. 4A, the scenarios 42 and 44 have a common destiny).

In another approach, it is possible to use a Viterbi algorithm. This approach calls for analyzing the set of key images of the content to be analyzed, and, by a back-tracking procedure, it makes it possible, at the end of the analysis of the suspect content, to bring out the most probable scenario (corresponding to a path in the tree). It can be noted that, in this approach, the result is returned at the end of the analysis or at any instant at request but not on the fly.

Figure 4B:
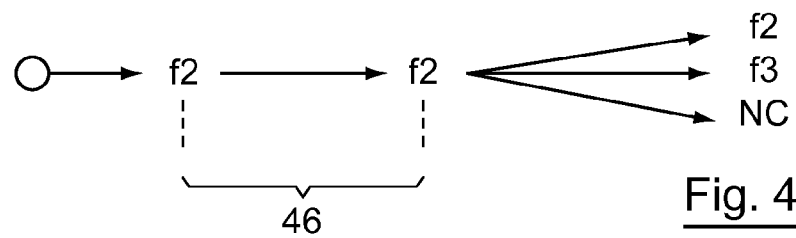

Effective approximations can also be envisaged by stripping the tree of the scenarios as and when they are computed, as illustrated in FIG. 4B.

It is also possible to add a supplementary criterion for restricting the number of scenarios preserved to those for which the probability is greater than a fraction of the probability of the most probable scenario.

More specifically, it is possible at each instant to update the different scenarios, and keep only the N best ones, i.e. the N most probable scenarios. For example, it is possible to choose N=20 in a real case.

It is also possible, in conjunction with this restriction or by taking its place, to keep only those scenarios which, at the current instant, have an identification probability above a fixed threshold or else to add an additional criterion for restricting the number of scenarios kept to those for which the probability is greater than a fraction of the probability of the most probable state.

Thus, one keeps the most relevant scenarios which will have a chance of leading to the best solution, based on their probability at the current instant. It is thus possible, according to the disclosure, to provide a quasi-optimal result online.

For example if, on the basis of the selection criteria referred to here above, one only keeps the scenarios 43, 44, and 45, it is noted that these have a common root 46: these three scenarios correspond to the detection of the reference video f2 at the instants $t_0$ and $t_1$. The result is then certain for the two key images corresponding to the instants $t_0$ and $t_1$. In other words, this result will no longer change whatever the future detections will be. Thus, a deterministic (sure) result has been provided with a minimum time limit (i.e., on the fly). This time-limit is self adapting and depends on the sequencing of the observations.

More generally, at the current instant t, the p possible scenarios will have a common root (corresponding to what has been detected between 0 and t−m), indicating that the new candidate images no longer have any influence on what happened m images earlier. This common root is a partial result of detection of video copies obtained on the fly. The value of m (final decision time) is generally low. It is not fixed but obtained automatically by the algorithm.

Thus, if the algorithm identifies the fact that a scenario is preponderant relatively to the others, m will be low and the detection almost instantaneous (this scenario will get established as a common root of the current scenarios), while, if several scenarios are competing, m will be higher, and an additional time limit will be necessary to support either of the assumptions of scenarios.

FIG. 5 illustrates an example of a result of analysis of the multimedia content to be analyzed 20. After an implementation of the analysis method according to the disclosure, it can be detected that the multimedia content 20 comprises first of all a non-referenced segment (NC) and then a portion of the video f2 referenced in the reference base, again a non-referenced segment and then a new video portion f3 referenced in the reference base, etc.

D) Example of Implementation

Here below, we describe an example of implementation of the disclosure for a time span and the key image corresponding to the content to be analyzed.

It is deemed to be the case for example that the merger module according to the disclosure takes the following at an input:
  observations $z_{ik}$ at the instant $t_k$ (i=1 ... m) and their scores (in reality m depends on k, but the index k is overlooked in order to simplify the writing). The set of observations can also be empty;
  a set $E_{k-1}$ of possible scenarios (also called assumptions or samples) and their identification probabilities, obtained at a previous iteration, or the vacant set if the current image is the first key image.

Thus, the merger module delivers at an output:
  a set $E_k$ of possible scenarios and their probabilities after an exploitation of the key image at the instant $t_k$.

More specifically, the merger module implements the following steps:
1. Computation of the probabilities of a false alarm $pfa(z_{ik})$ for the observations at input;
2. if the current image is the first key image of the content to be analyzed (initialization):
  the set $E_1$ is initialized with the different values of $z_{ik}$, and a weight $(1-pfa(z_{ik}))/pfa(z_{ik})$ (equation (2)) divided by the product of all the probabilities of a false alarm. This coefficient is applied systematically, which does not affect the proportions and therefore the final result);
  the image NC is added with a weight of 1 (equation (4)) divided by the product of the probabilities of a false alarm);
  an exit is made from the procedure with $E_1$ as an output.
3. Else (standard iteration at the instant $t_k$):
  loop to the observations $z_{ik}$, i=1 ... m:
    loop to the elements j of the set $E_{k-1}$ (j=1 ... N) containing the scenarios chosen between the initial instant and the instant $t_k$. The current scenario j is increased virtually by the current observation i and assigned a weight (which corresponds, through a constant of standardization, to the identification probability) which is the product of a propagation weight (which corresponds, through a constant of standardization, to the transition probability) by a likelihood weight (which corresponds, through a constant of standardization, to the likelihood probability).

Therefore:
  if $z_{ik}$ is consistent with the scenario j (coming from the same video with compatible shifts D), the element (scenario) j of $E_{k-1}$ is extended and allocated a multiplier coefficient $$\frac{W_c}{S_w} \frac{1 - pfa(z_{ik})}{pfa(z_{ik})};$$

It can be noted that, in this implementation, the probability $pfa(z_{ik})$ cannot be zero since this would lead to a division by zero. This situation indicates that we are certain of the observation $z_{ik}$ in which case it is enough to keep only one possible scenario (the one having the best identification probability when it is extended with $z_{ik}$), and allocate the weight 1 to the scenario thus extended;
  if not, the multiplier coefficient is $$\frac{W_0}{S_w} \frac{1 - pfa(z_{ik})}{pfa(z_{ik})}$$

(transition to another key image);
  among all the scenarios envisaged in the loop on the elements of $E_{k-1}$ above, we only preserve the one leading to the highest weight which corresponds, through a constant of standardization, to the identification probability of this scenario) which is inserted into $E_k$ with an accurately updated weight.
taking into account the possibility of having a non-referenced image in the reference base (images NC):
  loop to the elements of the set $E_{k-1}$;
  These scenarios are virtually increased with "NC" and their weights are allocated a multiplier coefficient equal to:

$$\frac{W_{nc}}{S_w} \frac{1 - pfa(z_{ik})}{pfa(z_{ik})}$$

if the previous image in the scenario was not "NC"; if not $$\frac{W_{cnc}}{S'_w} \frac{1 - pfa(z_{ik})}{pfa(z_{ik})}.$$

as above, it is only the scenario of the greatest weight that is retained and it is integrated with the set $E_k$.
taking into account non-detections:
  loop to the scenarios of the set $E_{k-1}$ that have not yet been extended and integrated with the set $E_k$;
  They are increased by the same instantaneous state as the one obtained at the previous instant, and their weights are multiplied by $$\frac{W_c}{S_w}(1-Pd).$$

all these scenarios are integrated with the set $E_k$.

standardization: the weight of each element of the set $E_k$ is divided by the sum of all the weights (to have the sum at 1);

selection: here it is possible to choose to keep, in the set $E_k$, only the N best scenarios, and/or those that have a probability above a certain threshold, etc;

stop criterion: depending on the application, it is sought to determine the root common to all the scenarios which were kept and to make an assessment on whether it is possible to decide definitely on the presence of a referenced content in the analyzed video. As the case may be, it may be chosen to stop the procedure of analysis.

3. Advantages Related to the Disclosure

The technique of the disclosure has several advantages. In particular:

it relies, on the one hand, on the search for elementary candidate entities and, on the other hand, on the merging of the results for all the key elementary entities of the multimedia content to be analyzed by their temporal consistency;

the detection of copies can be done on the fly in exploiting especially the temporal consistency. This is modeled in a probabilistic way and entails no strong assumption on the duration of the segment to be analyzed (video for example) or on the number of elementary key entities to be analyzed before returning a response (recognition decision). This response time can be adapted dynamically as a function of the multimedia content analyzed and the referenced content;

the tool is capable of identifying segments of indexed multimedia contents, possibly concatenated in the content to be analyzed;

should the multimedia content to be analyzed be a concatenation of segments of multimedia contents, the boundaries (start and end) of the segments can be retrieved by the merging module;

through the technique proposed, a less precise search engine can be available for seeking elementary candidate entities and thus increasing its speed, the loss of precision for each elementary entity being compensated for by the multiplicity of the temporally consistent elementary entities;

it is also possible to choose to interrupt the reading of a multimedia content to be analyzed once a fragment of content referenced in a reference base has been detected.

4. Structure of the Device for Analyzing

Finally, referring to FIG. 6, one presents the simplified structure of an analysis device for analyzing implementing a technique for analyzing a multimedia content according to the particular embodiment described here above.

Such an analysis device comprises especially a memory 61 constituted by a buffer memory, a processing unit 62 equipped for example with a microprocessor μP and driven by a computer program 63 implementing the method for analyzing a multimedia content according to the disclosure.

At initialization, the code instructions of the computer program 63 are loaded for example into a RAM and then executed by the processor of the processing unit 62. At an input, the processing unit 62 receives a multimedia content 20 to be analyzed. The microprocessor of the processing unit 62 implements the steps of the analysis method described here above according to the instructions of the computer program 63, to check whether or not the multimedia content 20 contains at least one reference content referenced in a base of reference contents. To this end, the analysis device comprises, in addition to the buffer memory 61, means for allocating a likelihood probability to each elementary entity of a set of current candidate elementary entities, means for allocating a transition probability between the current candidate elementary entity or entities and at least one previous candidate elementary entity; means for allocating an identification probability of at least once scenario formed by a temporal succession of candidate elementary entities, and means for deciding to recognize one of the reference contents and/or for continuing the analysis by means of a following elementary entity of said multimedia content. These means are driven by the microprocessor of the processor unit 62

The processing unit 62 can deliver an analysis result as illustrated in FIG. 5, and, as the case may be, can interrupt the downloading of the multimedia content if the reference content or portions of reference contents are detected in this content.

Although the present disclosure has been described with reference to one or more examples, workers skilled in the art will recognize that changes may be made in form and detail without departing from the scope of the disclosure and/or the appended claims.

The invention claimed is:

1. A method for analyzing a multimedia content, constituted by a temporal succession of elementary entities, aimed at checking whether or not the multimedia content includes a portion of at least one reference content referenced in a base of reference contents, wherein the method comprises the following steps for at least one elementary entity, of the multimedia content that is to be analyzed, and that is selected according to a predetermined selection rule, called a current elementary entity:

allocating, with a device, a likelihood probability to each elementary entity of a set of current candidate elementary entities, said likelihood probability taking into account a similarity between said elementary candidate entity and said current elementary entity of said multimedia content;

allocating a transition probability between said current candidate elementary entity or entities and at least one previous candidate elementary entity;

allocating an identification probability of at least one scenario formed by a temporal succession of candidate elementary entities, taking into account:

the likelihood probabilities allocated to the candidate elementary entities of said scenario; and the transition probabilities allocated to the candidate elementary entities of said scenario; and deciding to perform at least one of recognizing one of said reference contents or continuing analysis by a following elementary entity of said multimedia content, as a function of said identification probability.

2. The method for analyzing according to claim 1, wherein said candidate elementary entities belong to the group comprising:

an elementary entity belonging to one of said reference contents; and an elementary entity representing a content known as a "free" content, non-referenced in said reference base.

3. The method for analyzing according to claim 2, wherein said step of recognizing recognizes at least one portion of one of said reference contents or said free content.

4. The method for analyzing according to claim 1, wherein said step of allocating a likelihood probability takes into account a comparison between a descriptor of said current elementary entity and a descriptor of said candidate elementary entity.

5. The method for analyzing according to claim 1, wherein said step of allocating a transition probability allocates, to each current candidate elementary entity, a probability belonging to the group comprising:
- a first transition probability that said current candidate elementary entity and a previous candidate elementary entity belong to a same reference content;
- a second transition probability that said current elementary candidate entity and a previous candidate elementary entity belong to different reference contents;
- a third transition probability that said current candidate elementary entity belongs to a free content, not referenced in said reference base, and that a previous candidate elementary entity belongs to a reference content;
- a fourth transition probability that said current candidate elementary entity and a previous candidate elementary entity belong to a free content, not referenced in said reference database; and
- a fifth transition probability that said current candidate elementary entity belongs to a reference content and a previous candidate elementary entity belongs to a free content, not referenced in said reference base.

6. The method for analyzing according to claim 5, wherein said first transition probability is greater than or equal to said third transition probability which is itself greater than or equal to said second transition probability.

7. The method for analyzing according to claim 1, wherein:
said scenarios are represented in the form of a tree associating the set of previous candidate elementary entities with each of the current candidate elementary entities,
said step of allocating a likelihood probability allocates a likelihood probability to each of the nodes of the tree, and
said step of allocating a transition probability allocates a transition probability to each of the branches of the tree.

8. The method for analyzing according to claim 1, wherein the method comprises selecting a subset of the most probable scenarios.

9. The method for analyzing according to claim 8, wherein said selecting step selects the scenarios having an identification probability above a predetermined threshold.

10. The method for analyzing according to claim 8, wherein said selecting step selects N scenarios having the highest identification probabilities, with N as a positive integer.

11. The method for analyzing according to claim 7, wherein said step of recognizing recognizes a portion of one of said reference contents or of a free content, not referenced in said reference base, when the corresponding part of said tree comprises a single branch.

12. A non-transitory computer-readable carrier comprising a computer program product recorded thereon and executable by a processor, comprising program code instructions for implementing a method of analyzing a multimedia content, when executed by the processor, the content constituted by a temporal succession of elementary entities, aimed at checking whether or not the multimedia content includes a portion of at least one reference content referenced in a base of reference contents, wherein the method comprises the following steps for at least one elementary entity, of the multimedia content that is to be analyzed, and that is selected according to a predetermined selection rule, called a current elementary entity:
- allocating, with a device, a likelihood probability to each elementary entity of a set of current candidate elementary entities, said likelihood probability taking into account a similarity between said elementary candidate entity and said current elementary entity of said multimedia content;
- allocating a transition probability between said current candidate elementary entity or entities and at least one previous candidate elementary entity;
- allocating an identification probability of at least one scenario formed by a temporal succession of candidate elementary entities, taking into account:
  - the likelihood probabilities allocated to the candidate elementary entities of said scenario; and
  - the transition probabilities allocated to the candidate elementary entities of said scenario; and
- deciding to perform at least one of recognizing one of said reference contents or continuing analysis by a following elementary entity of said multimedia content, as a function of said identification probability.

13. A device for analyzing a multimedia content, constituted by a temporal succession of elementary entities, making it possible to check whether or not said multimedia content includes a portion of at least one reference content referenced in a base of reference contents, wherein the device comprises, for at least one elementary entity, of the multimedia content that is to be analyzed, and that is selected according to a predetermined selection rule, called a current elementary entity:
- means for allocating a likelihood probability to each elementary entity of a set of current candidate elementary entities, said likelihood probability taking into account a similarity between said elementary candidate entity and said current elementary entity of said multimedia content;
- means for allocating a transition probability between said current candidate elementary entity or entities and at least one previous candidate elementary entity;
- means for allocating an identification probability of at least one scenario formed by a temporal succession of candidate elementary entities, taking into account:
  - the likelihood probabilities allocated to the candidate elementary entities of said scenario; and
  - the transition probabilities allocated to the candidate elementary entities of said scenario; and
- means for deciding to perform at least one of recognizing one of said reference contents continuing the analysis by a following elementary entity of said multimedia content, as a function of said identification probability.

* * * * *